(12) United States Patent
Nakano et al.

(10) Patent No.: US 8,618,399 B2
(45) Date of Patent: Dec. 31, 2013

(54) MUSICAL SCORE RECOGNITION DEVICE AND COMPUTER-READABLE STORAGE MEDIUM

(75) Inventors: Seiji Nakano, Shizuoka (JP); Naoyuki Tanaka, Shizuoka (JP)

(73) Assignee: Kabushiki Kaisha Kawai Gakki Seisakusho, Hamamatsu-shi (JP)

( * ) Notice: Subject to any disclaimer, the term of this patent is extended or adjusted under 35 U.S.C. 154(b) by 147 days.

(21) Appl. No.: 13/336,694

(22) Filed: Dec. 23, 2011

(65) Prior Publication Data

US 2012/0160077 A1 Jun. 28, 2012

(30) Foreign Application Priority Data

Dec. 27, 2010 (JP) ................... 2010-291031

(51) Int. Cl.
*G06K 9/00* (2006.01)
(52) U.S. Cl.
USPC ........................ 84/477 R; 382/113
(58) Field of Classification Search
USPC ........................ 84/477 R; 382/113
See application file for complete search history.

(56) References Cited

U.S. PATENT DOCUMENTS

| | | | | | |
|---|---|---|---|---|---|
| 4,974,260 | A | * | 11/1990 | Rudak | 382/311 |
| 5,706,363 | A | * | 1/1998 | Kikuchi | 382/113 |
| 5,790,688 | A | * | 8/1998 | Kikuchi | 382/113 |
| 5,825,905 | A | * | 10/1998 | Kikuchi | 382/113 |
| 5,864,631 | A | * | 1/1999 | Shutoh | 382/113 |
| 5,883,970 | A | * | 3/1999 | Kikuchi | 382/113 |
| 6,046,394 | A | * | 4/2000 | Hino | 84/477 R |
| 6,137,041 | A | * | 10/2000 | Nakano | 84/470 R |
| 6,580,805 | B1 | * | 6/2003 | Nakano | 382/100 |
| 7,919,703 | B2 | * | 4/2011 | Hong et al. | 84/483.1 |
| 8,008,562 | B2 | * | 8/2011 | Ikeda et al. | 84/477 R |
| 8,067,682 | B2 | * | 11/2011 | Fahn et al. | 84/616 |
| 8,275,203 | B2 | * | 9/2012 | Hori et al. | 382/181 |
| 8,440,901 | B2 | * | 5/2013 | Nakadai et al. | 84/612 |
| 8,442,325 | B2 | * | 5/2013 | Hong et al. | 382/190 |
| 2006/0150803 | A1 | * | 7/2006 | Taub | 84/616 |
| 2009/0158915 | A1 | * | 6/2009 | Ishii et al. | 84/483.1 |
| 2012/0160077 | A1 | * | 6/2012 | Nakano et al. | 84/477 R |

FOREIGN PATENT DOCUMENTS

JP 2001-51677 A 2/2001

* cited by examiner

*Primary Examiner* — Elvin G. Enad
*Assistant Examiner* — Robert W Horn
(74) *Attorney, Agent, or Firm* — Birch, Stewart, Kolasch & Birch, LLP

(57) ABSTRACT

There are provided an image acquisition unit acquiring an image containing information of a paper-based musical score from an image reading-out unit, and a musical character recognition unit recognizing a musical character contained in the image acquired by the image acquisition unit by using a plurality of musical character recognition methods, and outputting a plurality of musical character recognition results.

7 Claims, 7 Drawing Sheets

FIG. 8A
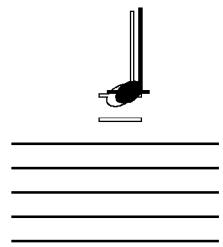
↓ ESTIMATION PROCESSING
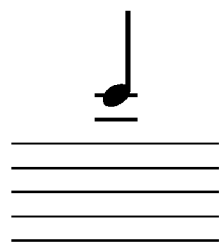
FIG. 8B
FIG. 8C
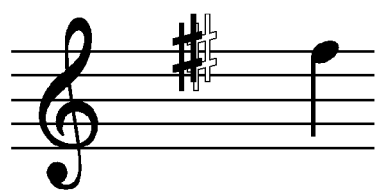
FIG. 8D
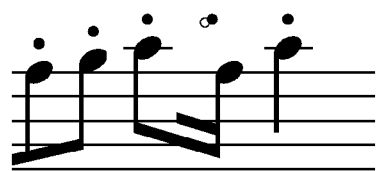

MUSICAL SCORE RECOGNITION DEVICE AND COMPUTER-READABLE STORAGE MEDIUM

CROSS-REFERENCE TO RELATED APPLICATIONS

This application is based upon and claims the benefit of priority of the prior Japanese Patent Application No. 2010-291031, filed on Dec. 27, 2010, the entire contents of which are incorporated herein by reference.

BACKGROUND OF THE INVENTION

1. Field of the Invention

The present invention relates to a musical score recognition device and a computer-readable storage medium, and, in particular, to a technique suitable to be used for recognizing a paper-based musical score with a high degree of accuracy.

2. Description of the Related Art

It has been performed conventionally that a paper-based musical score is read out by using a scanner and the like, and that in read out data of the musical score, staffs, notes and other musical characters of various kinds are recognized thereby to create performance data such as MIDI file data and data for display/print from a result of recognition.

For example, Patent Literature 1 suggests an image reproducing device converting an inputted data row in accordance with a conversion rule to change a data row, generating an image made by expressing the converted data row in a second axis direction in order of the data row along a first axis, and print-outputting by a printer, and an image reproducing device recognizing data based on an image photographed by a camera and reproducing a data row in accordance with a conversion rule to change recognized data.

Conventionally, for a certain recognition target on a musical score, it is tried to achieve a recognition result as accurately as possible by using a specific recognition method. If the recognition target cannot be recognized by that recognition method, there is performed adjusting of a parameter or a threshold value of a processing, addition of a new conditional expression by acquisition of a new parameter, addition of a matching dictionary, and the like, thereby to enable recognition of the musical score.

If recognition is not possible even by such a measure, by devising a countermeasure such as developing another recognition method to enable recognition of the musical score, it is tried to output a recognition result as accurate as possible by using any one of recognition methods.

[Patent Literature] Japanese Laid-open Patent Publication No. 2001-051677

For a practical use of a musical score recognition technique, it has been necessary to repeat such operations as verifying a recognition rate of a recognition result and adding measures to prevent error recognition of a musical score. It is quite difficult to completely prevent error recognition of a musical score, and there is a problem that by repeating such operations a recognition method becomes complicated, making improvement of the recognition method gradually difficult.

SUMMARY OF THE INVENTION

In view of the above-described problems, an object of the present invention is to improve a recognition rate of an entire musical score without complicating a recognition method.

A musical score recognition device of the present invention includes: an image acquisition unit acquiring an image containing information of a paper-based musical score from an image reading-out unit; and a musical character recognition unit recognizing a musical character contained in the image acquired by the image acquisition unit by using a plurality of musical character recognition methods, and outputting a plurality of musical character recognition results.

A computer-readable storage medium of the present invention stores: a computer program means for causing a computer to execute an image acquisition step to acquire an image containing information of a paper-based musical score from an image reading-out unit and a musical character recognition step to recognize a musical character contained in the image acquired in the image acquisition step by using a plurality of musical character recognition methods and to output a plurality of musical character recognition results.

BRIEF DESCRIPTION OF THE DRAWINGS

FIG. 8A is a diagram explaining a first concrete example of overlap performed in the estimation processing;

FIG. 8B is a diagram explaining a second concrete example of overlap performed in the estimation processing;

FIG. 8C is a diagram explaining a third concrete example of overlap performed in the estimation processing; and FIG. 8D is a diagram explaining a fourth concrete example of overlap performed in the estimation processing.

DETAILED DESCRIPTION OF THE PREFERRED EMBODIMENTS

First, an outline of the present embodiment will be described.

Conventionally, in a musical score recognition processing, in a case that an image label separated from a musical score by staff deletion or the like is a recognition target, when a specific musical character is recognized by a certain recognition method, that image label is deleted from an image. Then, that image label is made not to be a processing target in a recognition processing thereafter for another character. It has been conventionally general to avoid increase of a processing cost by doing as above. Here, an image label means a group of pixels judged to be a mass when a linkage of black pixels or the like is detected in a surrounding eight-connected or four-connected pixels from a certain dot.

However, because of higher speed of hardware in recent years and comparatively easy realization of a parallel processing, such necessity becomes low. In contrast, there is a problem of being fixed at a mistaken musical character in processes, as described at the beginning.

Thus, the present embodiment is characterized in that, in a case that a recognition result is outputted for one recognition target, instead of fixing at that recognition result by deleting an image label from an image, a recognition processing is performed for the recognition target also by another recognition method thereby to once make a plurality of recognition results overlap. Further, the present embodiment is characterized also in that a plurality of possible recognition results are allowed to be outputted per one recognition method. Hereinafter, the embodiment of the present invention will be described in detail.

Figure 1:
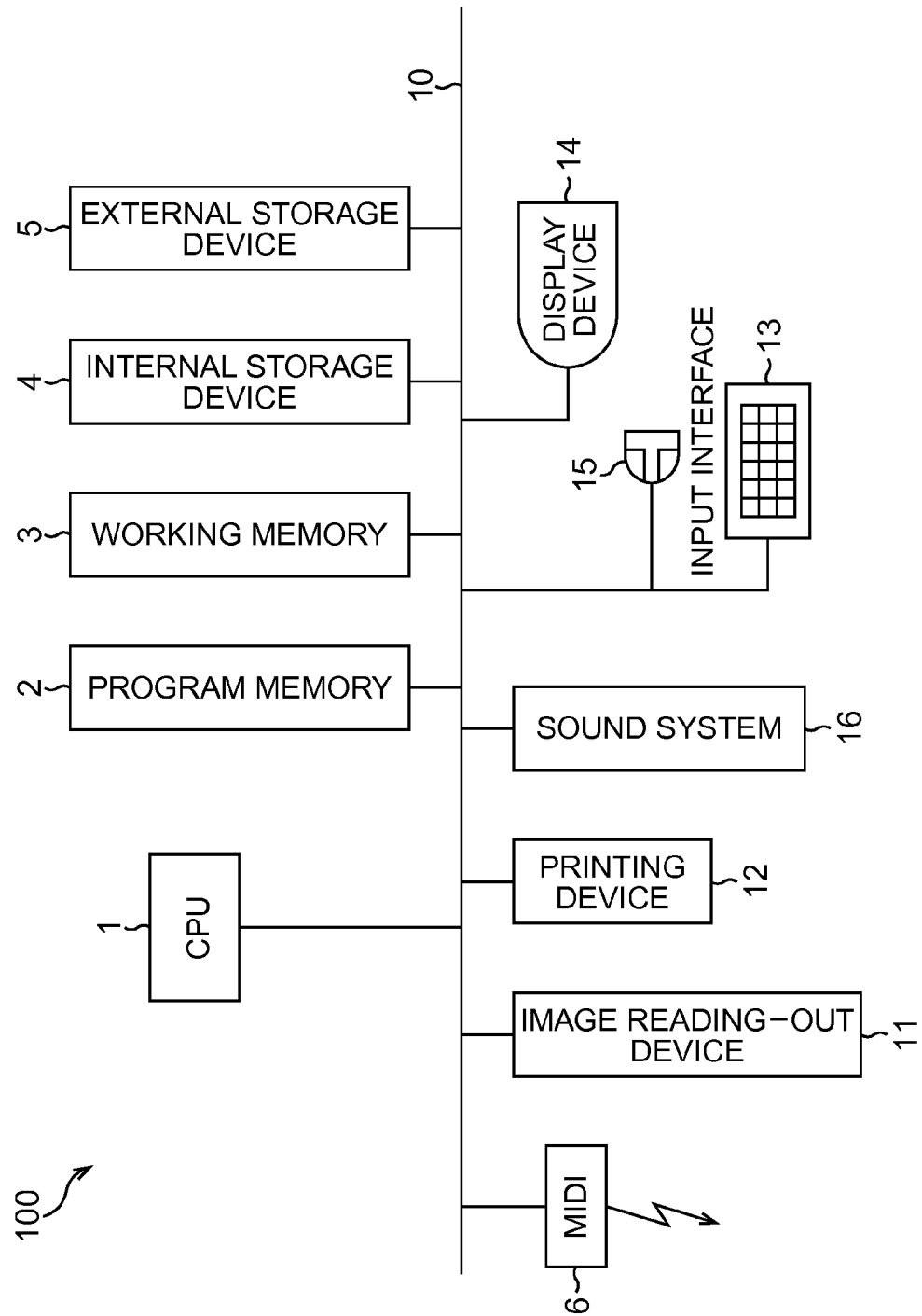
FIG. 1 depicts an embodiment of the present invention and is a block diagram depicting a configuration example of a musical score recognition device.

As depicted in FIG. 1, a musical score recognition device 100 of the present embodiment has an MIDI circuit 6 and an image reading-out device 11 added to a general computer system such as a personal computer.

A CPU 1 is a central processing unit which performs control of the entire musical score recognition device 100 by developing and executing a program stored in a program memory 2 in a working memory 3. The musical score recognition device 100 of the present embodiment houses a timer circuit which puts interruption into the CPU 1 at a predetermined period set in advance. The working memory 3 is used as a program area, and in addition, as an image data buffer, a work area, and the like. An internal storage device (constituted by an HDD, an SSD and the like) 4 and an external storage device (constituted by an FDD, a CD/DVD drive and the like) 5 stores a program, image data, performance data, and the like.

A display device 14 displays image information outputted from a bus 10, based on control of the CPU 1. Information inputted from a keyboard 13 is taken into the CPU 1 via the bus 10. A printing device 12 prints print information outputted from the bus 10, based on control of the CPU 1.

An image reading-out device 11 optically scans a musical score printed on a sheet and converts the musical score into binary, gray-scale, or colored image data thereby to perform an image acquisition processing. As the image reading-out device 11, there can be used a scanner of an arbitrary type such as a flat-bed type, a handy type, and a feeder type, as well as a camera and the like. The image information read out by the image reading-out device 11 is taken into the working memory 3 or the internal storage device 4 via the bus 10.

The MIDI circuit 6 is a circuit performing transmission/reception of MIDI data to/from external MIDI equipment such as a sound module. The bus 10 connects respective circuits in the musical score recognition device 100. It should be noted that other than the above, a mouse 15, a sound system 16 and the like are provided.

Figure 2:
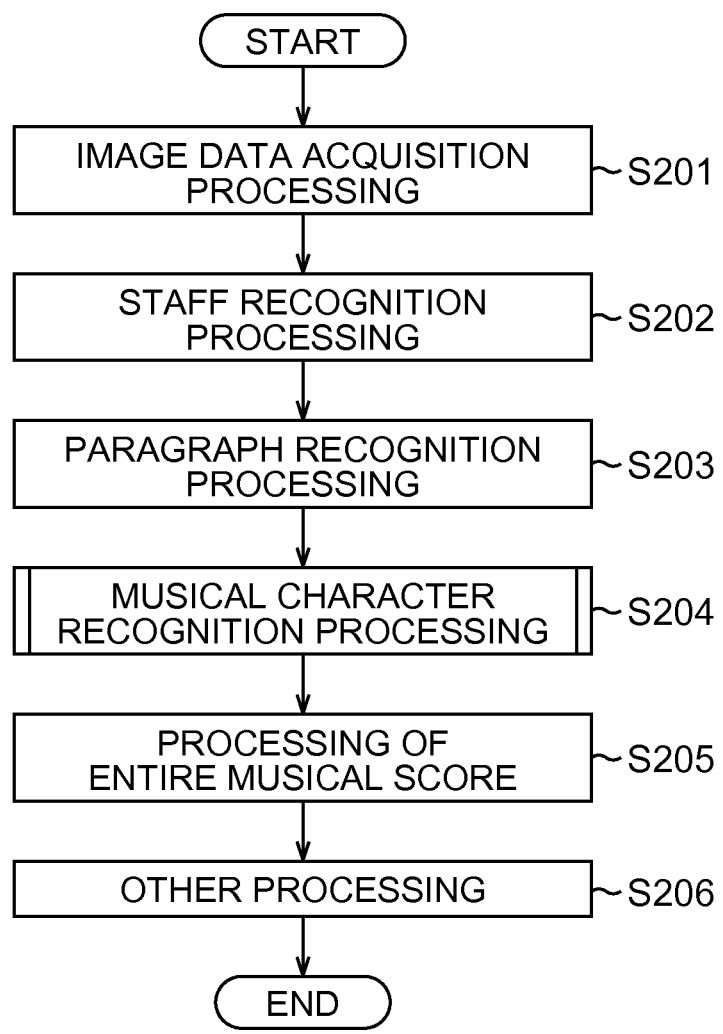
FIG. 2 is a flowchart explaining an outline of a processing procedure of the musical score recognition device of the embodiment.

FIG. 2 is a flowchart explaining an outline of a processing procedure of the musical score recognition device 100 of the present embodiment. The musical score recognition device 100 of the present embodiment is characterized in that the musical score recognition device 100 performs a musical score recognition processing by using a plurality of recognition methods. Moreover, the musical score recognition device 100 of the present embodiment does not delete a character label on an image from the image based on a recognition result in a first stage, even if the musical score recognition device 100 recognizes a musical character.

As depicted in FIG. 2, when the musical score recognition processing is started, the CPU 1 performs the image acquisition processing in a step S201. In the image acquisition processing, there is performed a processing such as taking image data of a musical score read out by the image reading-out device 11 into the working memory 3.

Next, in a step S202, the CPU 1 performs a staff recognition processing. The staff recognition processing is performed while a plurality of relevant images is read out in each page.

In the staff recognition processing, a staff scanning start position detection processing, a staff shift amount detection processing, and the like are performed. An outline of the staff scanning start position detection processing will be described. First, in a horizontal (x) axis direction, a width of a black pixel and a width of a white pixel at a certain position are obtained in sequence. Next, based on the obtained widths, positions of staff-shaped alignment are detected with an error of a certain degree being taken into consideration. Then, in order to eliminate an influence of a ledger line (horizontal line added for writing a note out of a staff), there is added a condition that white pixel widths larger than an interval of the staff exist in both sides of the staff-shaped alignment. A middle point of each black run in the horizontal (x) direction where an array of white and black pixels matching this condition exists is to be a staff scanning start position. Here, a run means a length in which black pixels or white pixels are connected vertically or horizontally, for example, in a case of a monochrome image (binary image of white and black).

Next, in a step S203, the CPU 1 performs a paragraph recognition processing. In the paragraph recognition processing, a paragraph recognition processing, a brace recognition processing, and the like are performed. In the paragraph recognition processing, a staff is detected in the entire image, a group of staffs whose left ends are in almost the same place are looked for among the staffs, it is inspected whether or not the end portions of the staffs are joined by a black pixel, and a paragraph is recognized from a result of inspection. If staffs are joined by a brace, there is a possibility that a note or the like which spans the staffs exists, so that it is better to perform a processing for the staffs joined by the brace as one unit. With regard to the brace, recognition is performed in a predetermined range of the left of a paragraph line. Here, a paragraph line means a line linking left ends of staffs in a plurality of parts progressing simultaneously. A paragraph means a mass of a plurality of staffs linked by the paragraph line. It should be noted that if the number of parts is one, the paragraph line does not exists. However, also in this case a mass equivalent to a paragraph in a musical score in which a plurality of parts exists is referred to as a paragraph. Further, a brace is a musical character which is often used in a musical score for a piano in particular and is a bracket indicated by "{" for combining two or three staffs.

Next, in a step S204, the CPU 1 performs the musical character recognition processing. Details of the musical character recognition processing will be described later with reference to a flowchart of FIG. 3.

Next, the process is proceeded to a step S205, and a processing of the entire musical score is performed. A processing of the entire musical score means a processing to normalize a position of a bar line in the paragraph, a processing to achieve consistency of time signatures, and the like.

Next, in a step S206, the CPU 1 performs other processings. In other processings, processings such as to generate performance data of the MIDI file data and the like are performed.

Figure 3:
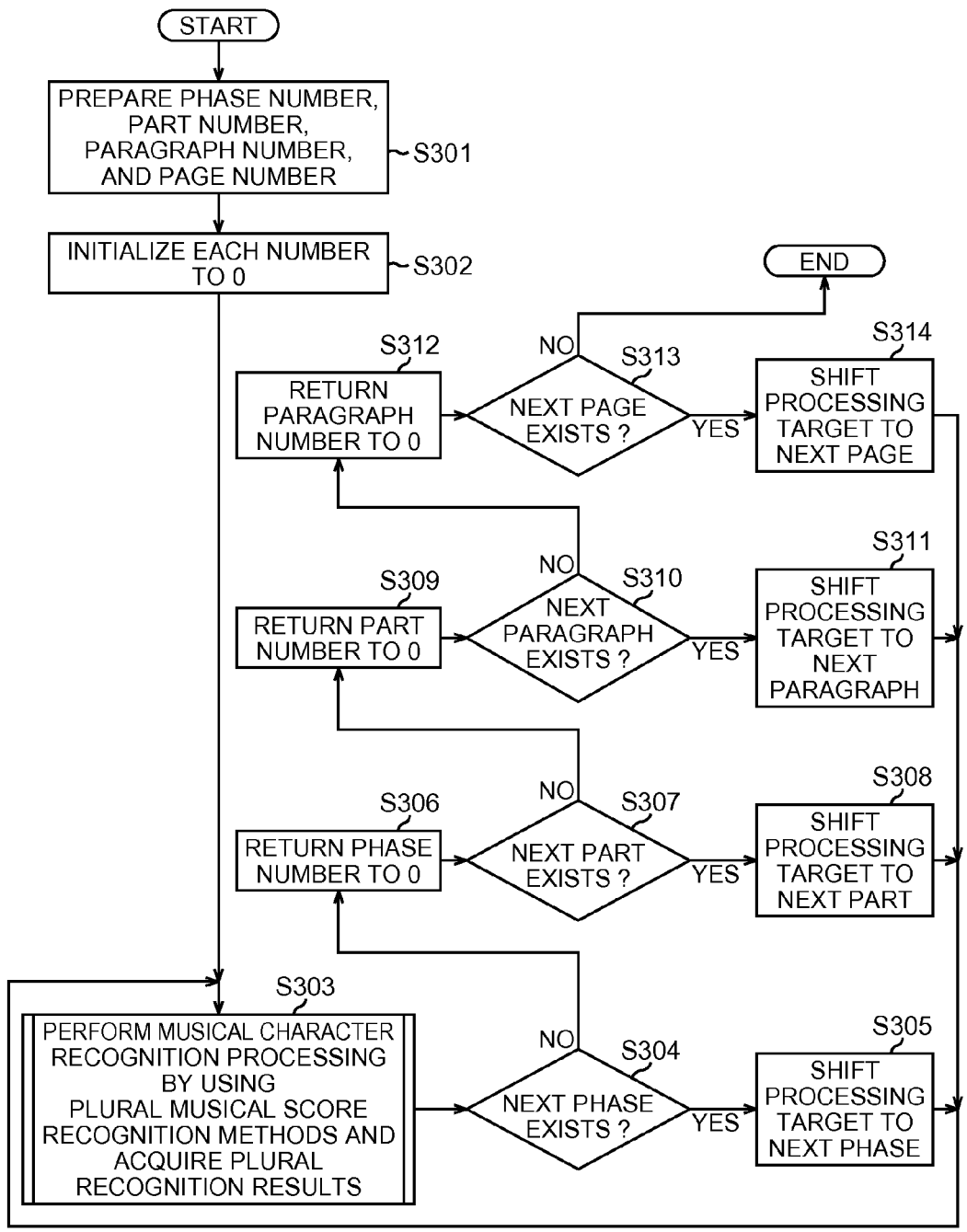
FIG. 3 is a flowchart explaining details of a musical character recognition processing performed in a step S204 of FIG. 2.

FIG. 3 is a flowchart explaining an example of the musical character recognition processing performed in the step S204 of FIG. 2.

As depicted in FIG. 3, when the musical score recognition processing is started, in a step S301 a processing to prepare variables such as a phase number, a part number, a paragraph number, and a page number is performed.

Next, the process is proceeded to a step S302, and the CPU 1 performs a processing to initialize all the variables prepared in the step S301 to "0" (zero).

Thereafter, the process is proceeded to a step S303, and the CPU 1 performs a recognition processing of a musical character by using a plurality of musical score recognition methods, thereby to acquire a plurality of recognition results. In this case, the CPU 1 first performs a recognition processing for a first phase. Then, after the recognition processing for that phase is finished, the process is proceeded to a step S304 and the CPU 1 judges existence/absence of a next phase. As a result of this judgment, if the next phase exists, the process is proceeded to a step S305 and the CPU 1 increments a phase number by one and shifts a processing target to the next phase.

Thereafter, the process is returned to the step S303, and as described above, the CPU 1 performs the recognition processing of the musical character by using the plural musical score recognition methods, thereby to obtain the plural recognition results. A loop processing of the step S303 to the step S305 is performed until a phase to be subjected to the recognition processing runs out. Then, as a result of the judgment of the step S304, the process is proceeded to a step S306 if the next phase runs out.

In the step S306, the CPU 1 performs a processing to return the phase number to "0" (zero), and thereafter, the process is proceeded to a step S307. In the step S307, the CPU 1 judges presence/absence of a next part. As a result of this judgment, if the next part exists, the process is proceeded to a step S308, and the CPU 1 increments a part number by one and shifts a processing target to the next part.

Thereafter, the process is returned to the step S303, and the CPU 1 performs a recognition processing for the next part from the first phase again thereby to obtain a plurality of recognition results. A loop processing from the step S303 to the step S308 is performed until a part to be subjected to a recognition processing runs out. Then, as a result of the judgment of the step S307, if the next part runs out, the process is proceeded to a step S309.

In the step S309, the CPU 1 performs a processing to return a part number to "0" (zero), and thereafter, the process is proceeded to a step S310. In the step S310, the CPU 1 judges presence/absence of a next paragraph. As a result of this judgment, if the next paragraph exists, the process is proceeded to a step S311, and the CPU 1 increments a paragraph number by one and shifts a processing target to a next paragraph.

Thereafter, the process is returned to the step S303, and the CPU 1 performs a recognition processing for the next paragraph from the first phase again thereby to obtain a plurality of recognition results. A loop processing from the step S303 to the step S311 is performed until a paragraph to be subjected to the recognition processing runs out. Then, as a result of the judgment of the step S310, if the next paragraph runs out, the process is proceeded to a step S312.

In the step S312, the CPU 1 performs a processing to return a paragraph number to "0" (zero), and thereafter, the process is proceeded to a step S313. In the step S313, the CPU 1 judges presence/absence of a next page. As a result of this judgment, if the next page exists, the process is proceeded to a step S314, and the CPU 1 increments a page number by one and shifts a processing target to the next page.

Thereafter, the process is returned to the step S303, and the CPU 1 performs a recognition processing for the next page from the first phase again thereby to obtain a plurality of recognition results. A loop processing from the step S303 to the step S314 is performed until a page to be subjected to a recognition processing runs out. Then, as a result of the judgment of the step S313, if the next page runs out, the process ends.

Figure 4:
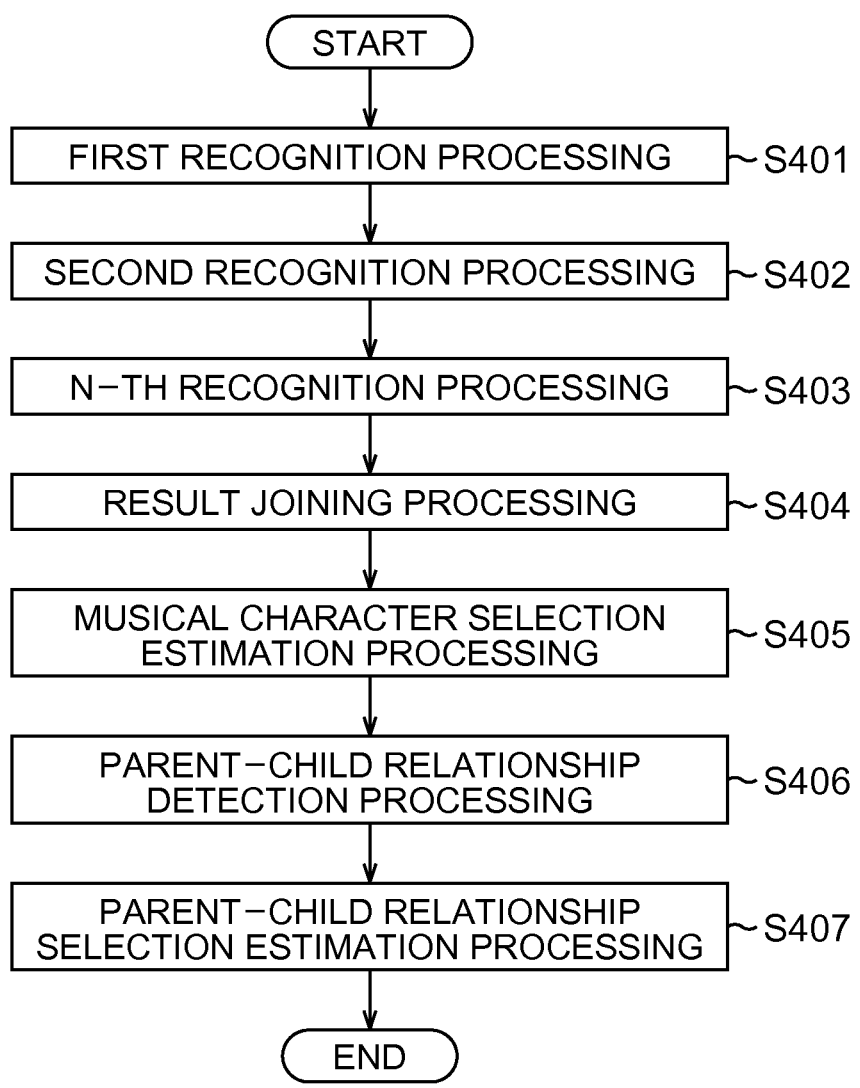
FIG. 4 is a flowchart explaining details of a musical character recognition processing performed in a step S303 of FIG. 3.

FIG. 4 is a flowchart explaining details of the musical character recognition processing performed in the step S303 in FIG. 3.

Hereinafter, an example of a recognition method used in a first recognition processing to a N-th recognition processing which are to be performed in steps S401 to S403 will be described.

Ellipse-straight line method: A method in which a base image is loaded, and bold-thin separation, vertical thin line detection, and ellipse detection are performed, and then respective detected objects are outputted as components (straight line component, ellipse component).

Dictionary matching method: A method in which a base image is loaded, and staff elimination, labeling, and dictionary matching are performed, and then a result of the dictionary matching is outputted as a dictionary matching component.

Component connection method: A method in which an ellipse component and a straight line component are connected and a musical character (symbol) is added.

Staff fixed position label extraction method: A method in which by narrowing down recognition targets to a character whose vertical position on a staff is fixed, or a character whose vertical position is fixed with a staff being a grid and a range where the character can be characterized exists in the staff, such as a clef, a time signature, an abbreviation, or an accidental notation or rest in the staff, a part which can sufficiently characterize a target image is accurately label-extracted, and a character which is hard to be affected by deformation, rubbing, and bleeding is extracted from an extracted label, without deleting the staff.

In a step S404, the CPU 1 joins contents and the like of the staff recognized in the staff recognition processing, of the paragraph recognized in the paragraph recognition processing, and of the part recognized in the part recognition processing, thereby to perform a joining processing to generate data of a musical score and so on. Therefore, in the musical score recognition device 100 of the present embodiment, there is performed a musical character recognition processing in which a musical score contained in the acquired image is recognized by a plurality of musical character recognition methods and a plurality of musical character recognition results are outputted. Further, the plural musical character recognition results recognized by the above is provided with a variety of information obtained by the musical character recognition result and stored in storage media such as a working memory 3, an internal storage device 4, and an external storage device 5.

The variety of information includes at least one of information indicating which musical character recognition method among the plural musical character recognition methods the musical character is recognized by, link information indicating which component the musical character is constituted by, and a confidence degree indicating what validity the character is recognized with, for example.

Next, the process is proceeded to a step S405, and the CPU 1 performs a musical character selection estimation processing. In the musical character selection estimation processing, the musical character adequate as a musical score among the overlapping musical characters is estimated by using the variety of information obtained by the musical character recognition result, and thereby one musical character is selected.

The variety of information includes at least one of the information indicating which musical character recognition method among the plural musical character recognition method the musical character is recognized by, the link information indicating which component the musical character is constituted by, and the confidence degree indicating what validity the character is recognized with, for example.

As an example of the musical character selection estimation processing, the following processing can be cited.

A recognition method 1 has a possibility of error recognition as B if a right answer of an attribute 1 is A. A recognition method 2 has little possibility of error recognition as B if the right answer of the attribute 1 is A. Assume that there are overlapping characters in the recognition results by the recognition method 1 and the recognition result by the recognition method 2, and that the attribute 1 is regarded as B in the recognition result by the recognition method 1 and regarded as A in the recognition result by the recognition method 2. In such a case, it is highly possible that the musical character recognized by the recognition method 2 is the right answer. It is a matter of course that thereby only the musical character recognized by the recognition method 2 can be selected and that the musical character to be selected can be judged per the attribute of the musical character.

Next, the process is proceeded to a step S406, and the CPU 1 performs a parent-child relationship detection processing. In the parent-child relationship detection processing, a character parent-child relationship such as of an accidental notation and a note is detected. It is not detection for a most adequate character parent-child relationship but it is detection for a character parent-child relationship which is probable in a range of some degree. A confidence degree is set for a musical character, while an appropriate attribute such as a position in a vertical direction and a position in a horizontal direction is considered, depending on the musical character.

Next, the process is proceeded to a step S407, and the CPU 1 performs a parent-child relationship selection estimation processing. In the parent-child relationship selection estimation processing, for a character which originally requires a plurality of parent characters, the parent characters are searched for in a manner that each point can have a plurality of candidates and a confidence degree is set. For example, as in a case of parents of a tie, there is a case that conditions exist for a plurality of corresponding parent notes (the plural parent notes to be parents of the tie have the same pitch, and so on). Therefore, judgment is done by the confidence degree and adequacy of a combination of the plural parent characters corresponding to the child character. In the present embodiment, a confidence degree indicates a likelihood value representing likelihood for each of the plural musical characters. In the present embodiment, a confidence degree calculation processing to calculate confidence information indicating what validity the musical character is recognized with is performed.

In an actual recognition processing, character recognition, attribute setting, a parent-child relationship detection processing and the like are to be performed per a processing phase by phase resolution, and an appropriate estimation processing is combined with the above in every processing phase, so that a musical character can be selected more appropriately.

For example, in a stage where numerous notes overlap, a character parent-child relationship cannot be detected correctly even if the parent-child relationship selection estimation processing is performed. Therefore, the parent-child relationship selection estimation processing is to be performed in a phase after overlap of notes or the like is settled in some degree by the musical character selection estimation processing.

Figure 5:
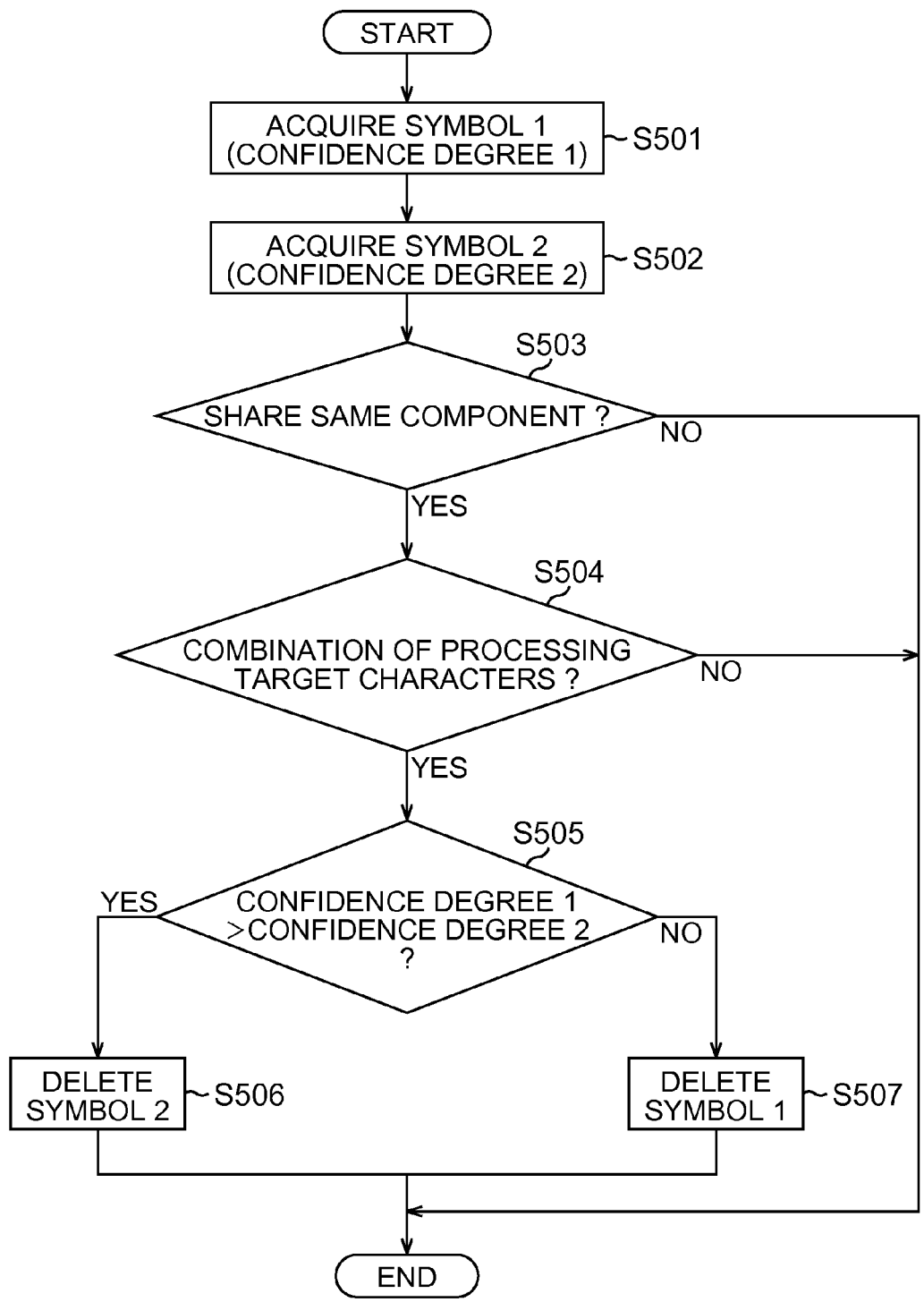
FIG. 5 is a flowchart explaining an example of a comparison processing of confidence degrees performed in an estimation processing.

Next, an example of comparison processings of confidence degrees performed in the musical character selection estimation processing and the parent-child relationship selection estimation processing will be described with reference to a flowchart of FIG. 5. In the processing of FIG. 5, an example of a comparison processing of confidence degrees in a case that two musical characters share a component is depicted. Symbol 1 and Symbol 2 indicate musical characters of estimation targets. Here, a component 1 is one of components constituting Symbol 1, while a component 2 is one of components constituting Symbol 2.

First, in a step S501, the CPU 1 acquires Symbol 1. In this case, a value of a character confidence degree of Symbol 1 is indicated as a confidence degree 1.

Next, in a step S502, the CPU 1 acquires Symbol 2. In this case, a value of a character confidence degree of Symbol 2 is indicated as a confidence degree 2.

Next, in a step S503, the CPU 1 judges whether or not Symbol 1 and Symbol 2 shares the same components. If Symbol 1 and Symbol 2 do not share the same components, this processing ends.

Further, if Symbol 1 and Symbol 2 share the same components, the process is proceeded to a step S504, and the CPU 1 judges whether or not a combination thereof is a combination of processing target characters. If the combination is not the combination of the processing target characters, this processing ends. If the combination is the combination of the processing target characters, the process is proceeded to a step S505.

In the step S505, the CPU 1 performs a comparison judgment processing of Symbol 1 and Symbol 2. As a result of this comparison judgment processing, if the confidence degree of Symbol 1 is larger than the confidence degree of Symbol 2, the process is proceeded to a step S506 and the CPU 1 performs a processing to delete Symbol 2. Further, if the confidence degree of Symbol 1 is not larger than the confidence degree of Symbol 2, the process is proceeded to a step S507 and the CPU 1 performs a processing to delete Symbol 1.

It should be noted that the judgment processing of the steps S505 can be performed per overlapping musical characters, and in some cases a processing other than large/small judgment of the confidence degree can be performed.

Figure 6:
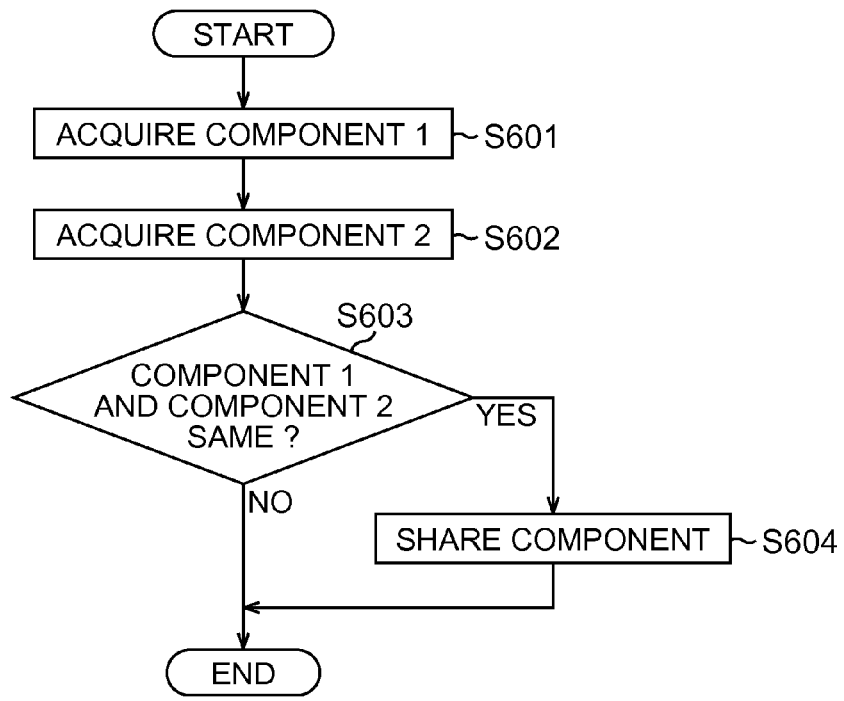
FIG. 6 is a flowchart explaining an example of a processing of component sharing performed in the estimation processing.

FIG. 6 is a flowchart explaining an example of the judgment processing performed in the step S503 in the flowchart of FIG. 5

The CPU 1 acquires the component 1 in a step S601 and acquires the component 2 in a step S602.

Next, in a step S603, the CPU 1 judges whether or not the component 1 acquired in the step S601 and the component 2 acquired in the step S602 are the same. If the component 1 and the component 2 are the same, in a step S604 the CPU 1 performs a processing to determine that the component is shared. If the component 1 and the component 2 are not the same, the processing ends.

Next, a concrete example of a confidence degree which is set for a note will be described with reference to FIG. 7.

Figure 7:
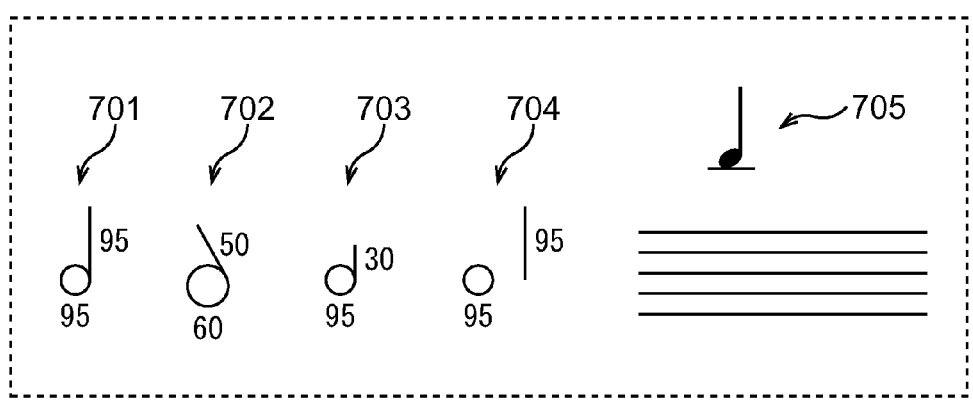
FIG. 7 is a diagram explaining a setting example of a confidence degree for a note.

As indicated by musical characters 701 to 704 in FIG. 7, a confidence degree as a component is set to each ball (ellipse) and each line. As indicated by "numeric character", the musical character 701 is one which is comparatively good, and a confidence degree of "95" is set for each of the ball (ellipse) and the line.

Further, as indicated by the musical characters 702, 703, the confidence degree of each component is to be decreased in correspondence with situations such that a ball size is inappropriate, a line is slant, a line is short, and others. Then, in order to recognize the musical character as a note, the ball and the line are connected, and a confidence degree is further set depending on a state of connection. In a case of the musical character 701, a confidence degree of connection is high. However, if a ball and a line is separated as in the musical character 704, a confidence degree of a note is reduced. In such a case, a confidence degree is reduced in correspondence with a distance separating the ball and the line.

Further, a confidence degree is set in relation to a pitch. In the musical character 705, only one ledger line is found and a position of the musical character 705 is apart from the staff though being set at a pitch corresponding to the one ledger line. In such a case, a confidence degree for the musical character 705 is reduced.

A confidence degree of a note (with a stem) can be also set by the following formula, for example.

$$confPer = w3 \times (w1 \times elpPer + w2 \times linePer) + w4 \times bindPer + w5 \times locPer$$

Here, "elpPer" indicates a ellipse component confidence degree, "linePer" indicates a line component confidence degree, "bindPer" indicates a ellipse-straight line connection confidence degree, and "locPer" indicates a pitch confidence degree. Further, "w1" to "w5" indicate weights and are set so that each attribute has an adequate validity and that a maximum becomes 100%.

Similarly, in a case of a note without a stem or the like, a confidence degree is set from existing information. Further, confidence degrees of other characters can be also set appropriately by a component constituting that character, a positional relationship of the component at a time of constituting the character, adequacy of a position and an attribute in a recognition result. As described above, the confidence degree of the recognition result can be calculated by integrating various conditions. By the above, a confidence degree which can be assumed adequately as a musical character on a musical score can be set.

A musical character is created by various recognition results and recognized, as described above. In the present embodiment, as described above, even if the musical character is recognized, the character label on the image is not deleted from the image based on the recognition result, in the first stage. Therefore, its result shows a state in which similar characters or analogous characters overlap each other at the same position.

Next, a concrete example of overlap of musical characters are described with reference to FIG. 8A to FIG. 8D.

FIG. 8A depicts an example of simple overlap. In the present embodiment, since a musical character is recognized by a plurality of recognition methods, the simple overlap as depicted in FIG. 8A occurs. In a case of this example, there is shown an example in which a note (note indicated by an outline) with a floating ledger line and a note (note indicated by black) without a ledger line overlap each other, and the note with the floating ledger line is selected by a musical character selection estimation processing. As in the example depicted in FIG. 8A, when the notes overlap each other, since confidence degrees of pitches for the respective notes being different, by performing a musical character selection estimation processing, one in which the ledger line is not correctly recognized is not selected but one in which the ledger line is correctly recognized is selected, whereby a correct recognition result can be obtained.

FIG. 8B depicts an example of error recognition in character. As an example of the error recognition in character, there is a case that notes are erroneously recognized in a G clef label as indicated by broken lines in FIG. 8B. The error recognition in character can be coped with by considering a recognition tendency and deleting a certain character overlapping a specific character.

Next, an example of component sharing overlap will be described.

In the present embodiment, in the recognized musical character, link information indicating what component constitutes the musical character is stored. For example, with regard to a note recognized from an ellipse and a straight line, if both a case of an upward stem and a case of a downward stem are assumed for the same vertical line, both notes are created. In this case, it can be instantly judged that both the upward and downward notes share the same vertical line. Thus, by judging based thereon that a component overlaps in a plurality of musical characters and selecting the musical character having a higher confidence degree therefrom, a more adequate result can be acquired.

Further, a component obtained by dictionary matching an image label is stored as a dictionary matching component. A musical character is created as what stores link information created from the component. If one component is assumed as a plurality of musical characters, both musical characters are created, and those musical characters share the same dictionary matching component. Thereby, overlap to be judged is estimated as follows.

First, as depicted in FIG. 8C, overlap of an accidental notation and a key signature is estimated.

A component (#) as a dictionary matching component, being a component constituting a key signature as a musical character or an accidental notation as a musical character, stores link information of such musical characters. If the key signature and the accidental notation as the musical character sharing the same component (#) exists, it can be judged that these are created from the same component. On this occasion, by comparing confidence degrees of both musical characters, it is possible to judge which is valid.

Next, as depicted in FIG. 8D, overlap of a dot of doted note and a staccato is estimated.

A component (dot) as a dictionary matching character can be a dot of a dotted note and can also be a staccato. Thus, in a case of two musical characters (symbols), (a dot of a dotted note and a staccato) created from the same component, it is judged that those two musical characters are created from the same component. Then, by comparing confidence degrees of both musical characters (symbols), it can be judged which is valid.

Other than the above, overlap of a character parent-child relationship is estimated.

In the aforementioned parent-child relationship detection processing of the step S406, if a plurality of parent characters exist, basically the processing is limited to the parent character having a highest confidence degree of the parent-child relationship. However, it is possible to chose an appropriate parent character depending on a situation of another child character to be connected to that parent character. For example, in selecting a character parent-child relationship of an accidental notation to a chord, if an accidental notation for which there is no other option but a certain note already exists, that note is to be the parent character regardless of the confidence degree.

Next, phase resolution will be described.

In the present embodiment, a processing order is set so that a musical character can be selected appropriately by the above estimation processing. Further, actual character recognition, attribute setting, parent-child relation detection processing and the like are performed per a processing phase and combined with an appropriate estimation processing in every processing phase, whereby a musical character can be selected more appropriately.

For example, if a parent-child relationship detection processing is performed in a stage where numerous notes overlap, correct detection cannot be done, and thus, a musical character selection estimation processing is performed thereby to perform a parent-child relationship detection processing in a later phase where overlap of notes or the like is settled in some degree.

More specifically, in "phase 0", (a) a note/another musical character recognition is performed in recognition processings 1 to N. (b) A basic character connection processing is performed. (c) An estimation processing (simple overlap settlement processing) is performed.

In "phase 1", (d) Another character connection processing is performed. (e) An estimation processing (overlap settlement processing including a chord configuration/parent-child relationship) is performed. (f) A parent-child relationship processing is performed.

It should be noted that "phase 2" and the like where processings other than the above-described (a) to (f) are performed can be performed depending on the circumstances.

Further, for example, in selecting a time signature, a dot of a dotted note, a phonetic value of a note, group notes, and the like, it is possible to select a musical character with which the number of beats in a bar becomes more correct. More specifically, it is possible to select one musical character from the time signature and the number of beats of the note.

Further, by deleting an image label on an image in a stage (phase) where a musical character which is adequate in some degree is selected and performing a recognition processing again, it is possible to recognize the musical characters whose image labels contact each other. With regard to such a part, it is possible to perform a processing to make a probable musical note overlap similarly to in a processing before deletion of the image label.

The present embodiment of the present invention described above can be realized as a result that a computer performs a program. Further, a computer-readable storage medium storing the above-described program and a computer program product such as the above-described program can be also applied as embodiments of the present invention. As the storage medium, there can be used, for example, a flexible disk, a hard disk, an optical disk, a magnetic optical disk, a CD-ROM, a magnetic tape, a non-volatile memory card, a ROM, and the like.

Further, it should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

According to the present invention, since adverse influences by a tendency of an individual recognition method, a processing order of various recognition methods, and the like are excluded thereby enabling an adequate recognition result to be obtained, a recognition rate can be surely improved without complicating a conventional recognition method.

What is claimed is:

1. A musical score recognition device, comprising:
   an image acquisition unit acquiring an image containing information of a paper-based musical score from an image reading-out unit; and
   a musical character recognition unit recognizing a musical character contained in the image acquired by said image acquisition unit by using a plurality of musical character recognition methods, and outputting a plurality of musical character recognition results.

2. The musical score recognition device according to claim 1, comprising:
   a musical character estimation unit estimating what is adequate as a musical score and selecting one musical character, for each of the plurality of musical character recognition results recognized by said musical character recognition unit by using various information obtained by said musical character recognition results.

3. The musical score recognition device according to claim 1, comprising:
   an information storage unit adding various information obtained by the musical character recognition results to the plurality of musical character recognition results recognized by said musical character recognition unit, and storing in a storage medium.

4. The musical score recognition device according to claim 2, wherein the various information includes at least one of information indicating which musical character recognition method among the plurality of musical character recognition methods the recognition is done by, link information indicating which component the recognized musical character is constituted by, and confidence degree information indicating what validity the recognized musical character is recognized with.

5. The musical score recognition device according to claim 1, wherein said musical character recognition unit performs a staff recognition processing, a paragraph recognition processing, a musical character recognition processing, and a processing of the entire musical score, detects a plurality of candidates about a relationship between musical characters, and estimates what is adequate as a musical score by using various information obtained by the musical character recognition results for each candidate thereby to select one relationship between musical characters.

6. The musical score recognition device according to claim 5, wherein the musical character recognition processing has a processing per a page, a processing per a paragraph, a processing per a part, and a processing per a phase, and wherein the above processings are performed to each of the musical characters contained in the image acquired by said image acquisition unit.

7. A computer-readable storage medium, comprising:
   a computer program means for causing a computer to execute an image acquisition step to acquire an image containing information of a paper-based musical score from an image reading-out unit and a musical character recognition step to recognize a musical character contained in the image acquired in the image acquisition step by using a plurality of musical character recognition methods and to output a plurality of musical character recognition results.

* * * * *